Figure 1:
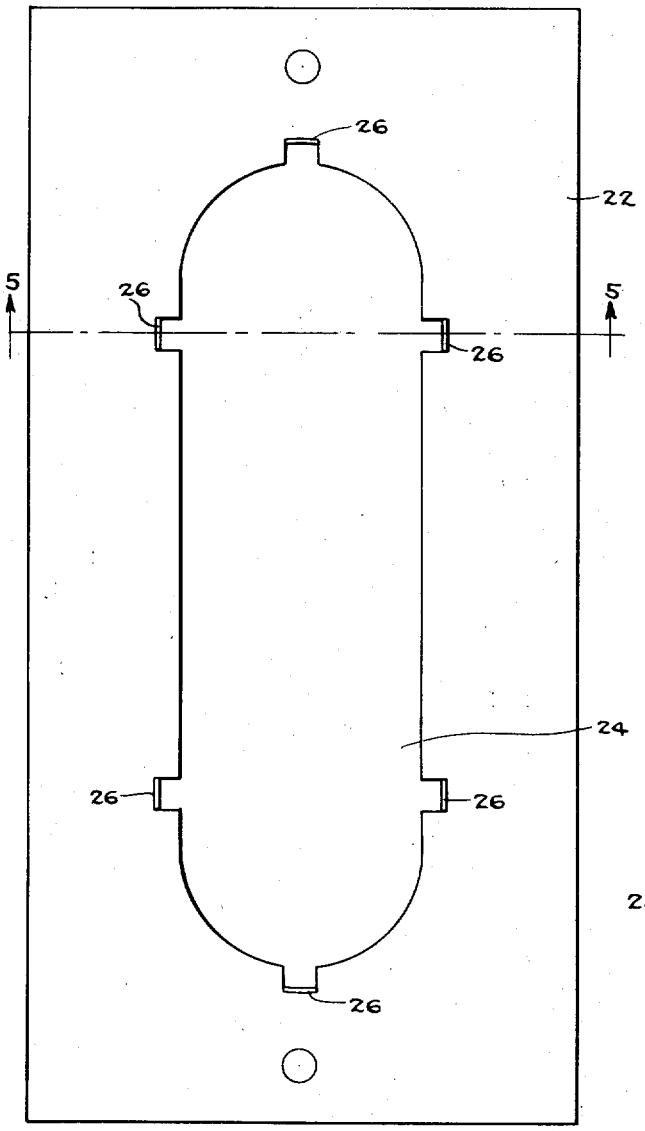

May 19, 1931. J. O. OLSON Re. 18,078

PROCESS OF MANUFACTURING HEAT EXCHANGERS

Original Filed Feb. 4. 1927 7 Sheets-Sheet 1

Inventor:
John O. Olson
By Whiteley and Ruckman
Attorneys.

May 19, 1931. J. O. OLSON Re. 18,078

PROCESS OF MANUFACTURING HEAT EXCHANGERS

Original Filed Feb. 4, 1927 7 Sheets-Sheet 2

Inventor:
John O. Olson.
By Whiteley and Ruckman
Attorneys.

May 19, 1931. J. O. OLSON Re. 18,078

PROCESS OF MANUFACTURING HEAT EXCHANGERS

Original Filed Feb. 4. 1927 7 Sheets-Sheet 3

Inventor:
John O. Olson.
By Whiteley and Ruckman
Attorneys.

May 19, 1931. J. O. OLSON Re. 18,078

PROCESS OF MANUFACTURING HEAT EXCHANGERS

Original Filed Feb. 4. 1927 7 Sheets-Sheet 4

Inventor:
John O. Olson
By Whiteley and Ruckman
Attorneys.

May 19, 1931. J. O. OLSON Re. 18,078
PROCESS OF MANUFACTURING HEAT EXCHANGERS
Original Filed Feb. 4, 1927 7 Sheets-Sheet 5
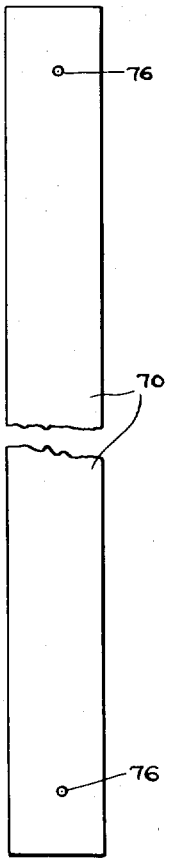
Fig-12
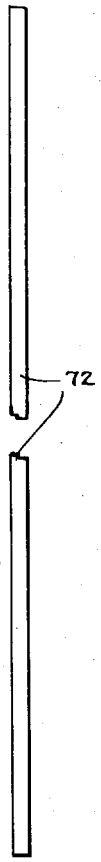
Fig-13
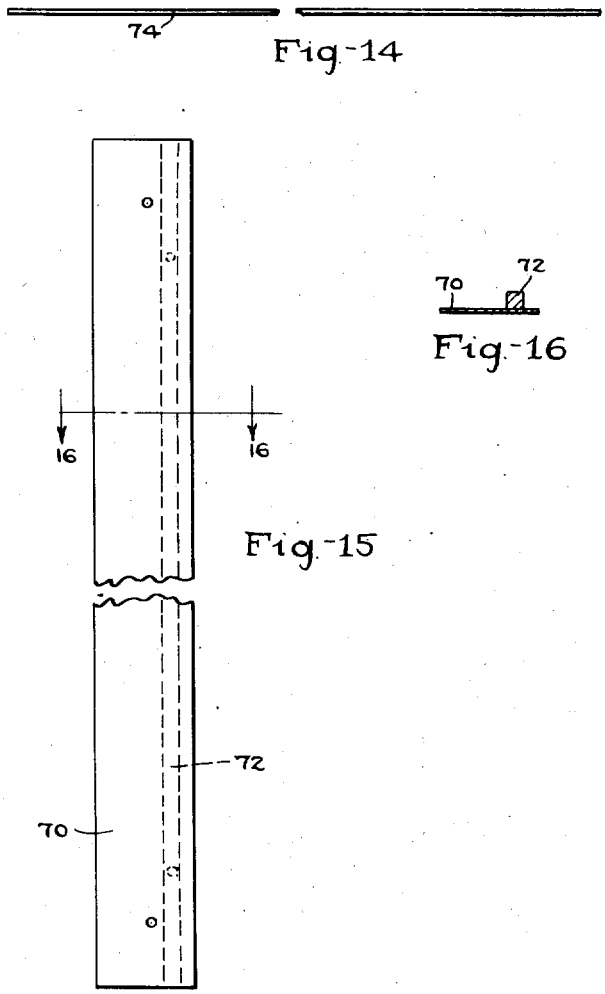
Fig-14
Fig-15
Fig-16
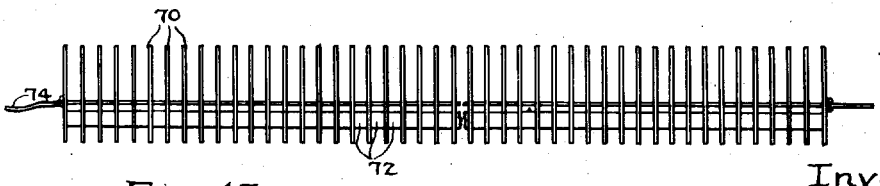
Fig-17
Inventor:
John O. Olson
By Whiteley and Prebble
Attorneys

PROCESS OF MANUFACTURING HEAT EXCHANGERS

Original Filed Feb. 4, 1927 7 Sheets-Sheet 6

Inventor:
John O. Olson.
By Whiteley and Prickman
Attorneys.

PROCESS OF MANUFACTURING HEAT EXCHANGERS

Original Filed Feb. 4. 1927 7 Sheets-Sheet 7

Inventor
John O. Olson.
By Whiteley and Ruckman
Attorneys

Reissued May 19, 1931 Re. 18,078

UNITED STATES PATENT OFFICE

JOHN OTTO OLSON, OF ST. PAUL, MINNESOTA

PROCESS OF MANUFACTURING HEAT EXCHANGERS

Original No. 1,742,556, dated January 7, 1930, Serial No. 165,860, filed February 4, 1927. Application for reissue filed November 22, 1930. Serial No. 497,591.

My invention relates to process of manufacturing heat exchangers and similar articles which are used in connection with steam or hot water and hot air heating plants, or wherever it is desired to transfer or exchange the heat of a heat-conveying medium into or from the air of rooms to be heated. The objects of the invention are to provide a heat exchanger which has a much greater radiating surface than heat exchangers now in use, in which said increased radiation is provided by sheet metal fins which are firmly embedded and anchored to a cast metal inner shell and hence may transmit the heat from said inner shell with the greatest efficiency, which may be economically and conveniently manufactured, and which is extremely strong and durable. I accomplish the objects of my invention by providing a plurality of metal fin plates and metal spacer elements, placing the fin plates and spacer elements in alternation to produce a built-up structure of previously-fabricated metal having enclosing side or circumferential walls with open ends, placing the built-up structure in molding position in relation to a core and molding members, whereby the wall or walls of the built-up structure constitutes one wall of the mold, and pouring molten metal into the space between the walls of said built-up structure and the core. In this manner the built-up structure is lined with cast metal, and the mold may be further developed so that the open ends are completed by the cast metal whereby a cast metal shell having an enclosed chamber is formed. The built-up structure produced as above noted to form walls of previously-fabricated metal has the fin plates so positioned that portions thereof extend beyond said wall and other portions project inwardly into the mold space. When the molten metal is poured, it becomes attached to the inside of the spacer elements while the inwardly projecting portions of the fin plates are anchored in the cast metal. If the metal of the built-up structure is the same as that of the casting metal, as if both are iron, wherein the fusion points are the same, the attachment and anchoring above referred to will be effected by more or less fusing together of the cast metal and the contacting parts of the built-up structure, so that the finished heat exchanger becomes an integral structure in which the cast metal is reenforced by sheet metal, and in which the outer margins of the metal sheets or fin plates project out from the spacer elements as fins, thus greatly increasing the radiating surface, and in the opposite direction the fin plates project inwardly and are embraced by, anchored to and become in effect an integral part of the cast metal inner shell.

For producing the built-up structure, I have found that scrap metal may be utilized with extremely good results, whereby the cost of the completed article is greatly reduced. Furthermore, the built-up structure actually constitutes part of the mold, so that the molding operation is very much simplified. These built-up walls take the place of wooden patterns for use in molding operations and no molding in damp sand is required, it being necessary only to provide the requisite core and mold members in addition to the built-up structure for completing the mold.

The full objects and advantages of my invention will appear in connection with the detailed description thereof, and the novel features of my inventive idea will be particularly pointed out in the claims.

Referring to the accompanying drawings, which illustrate some of the forms by which my invention may be practical—

Figure 2:
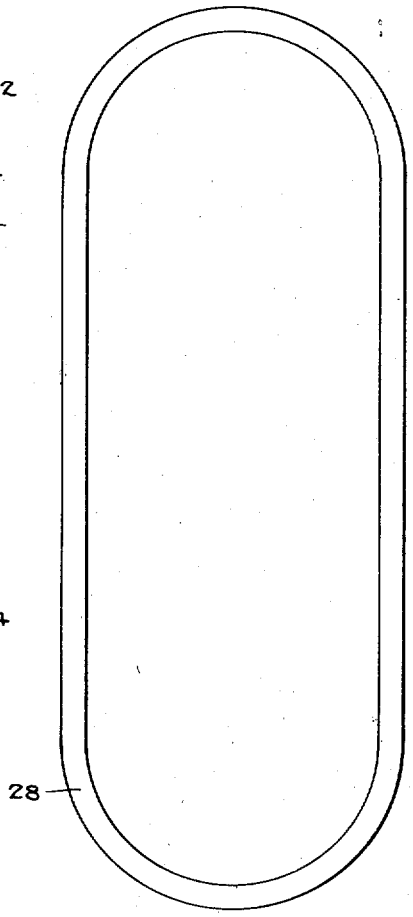
Figure 4:
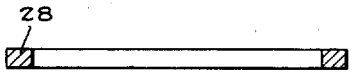
Figure 3:
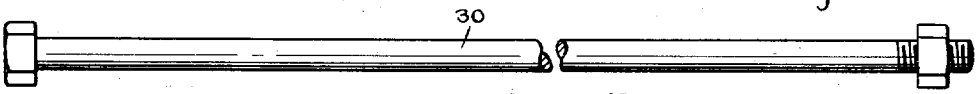
Figure 5:
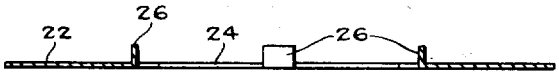
Figure 6:
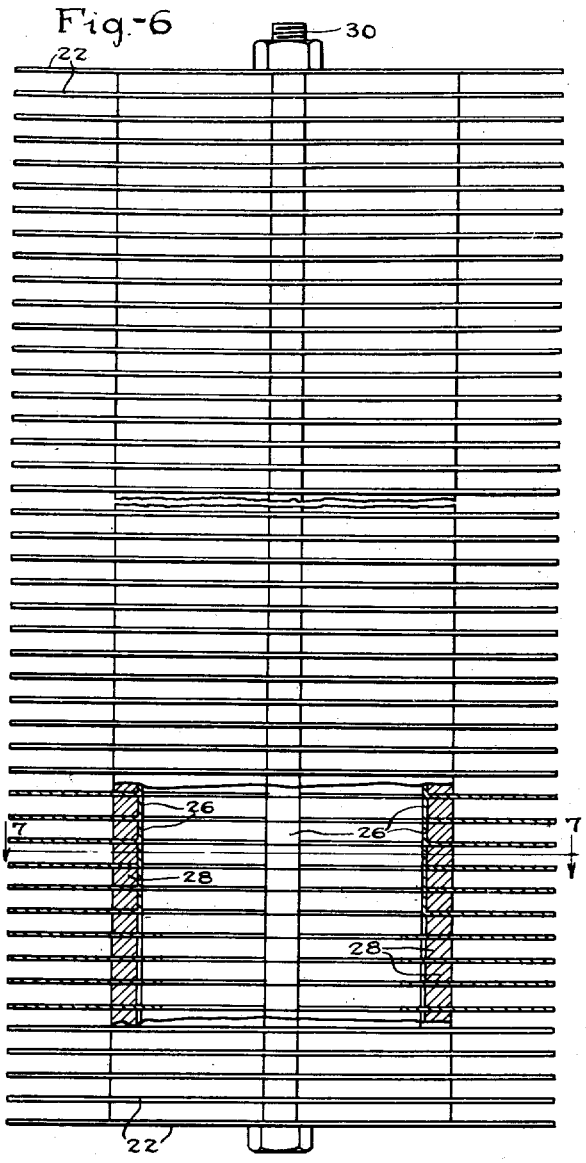
Figure 7:
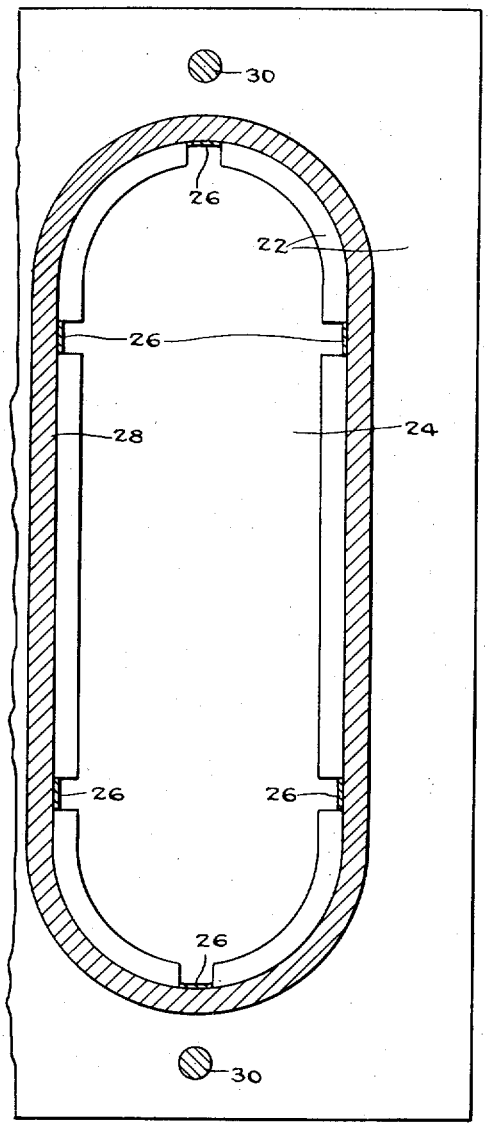
Figure 8:
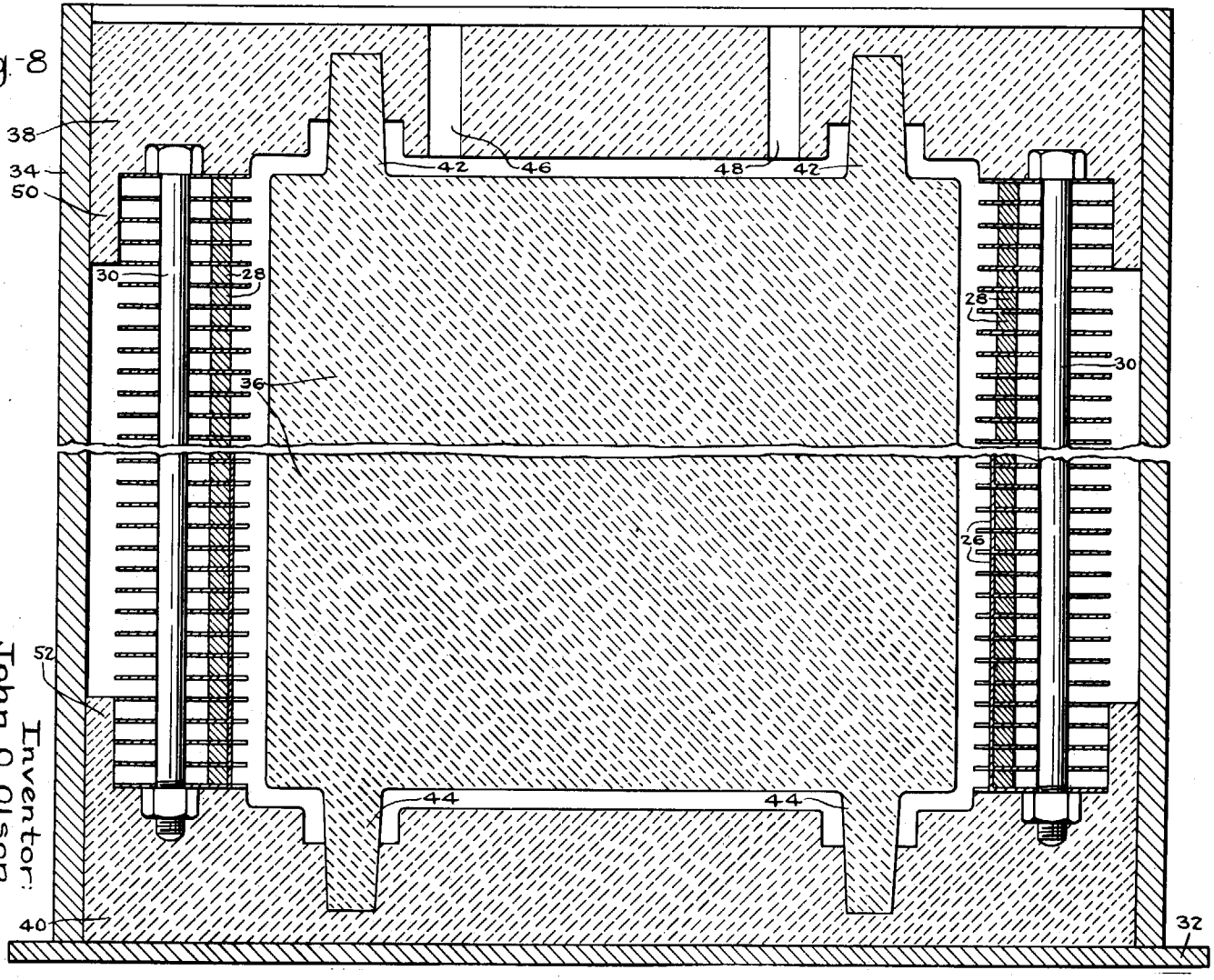
Figure 9:
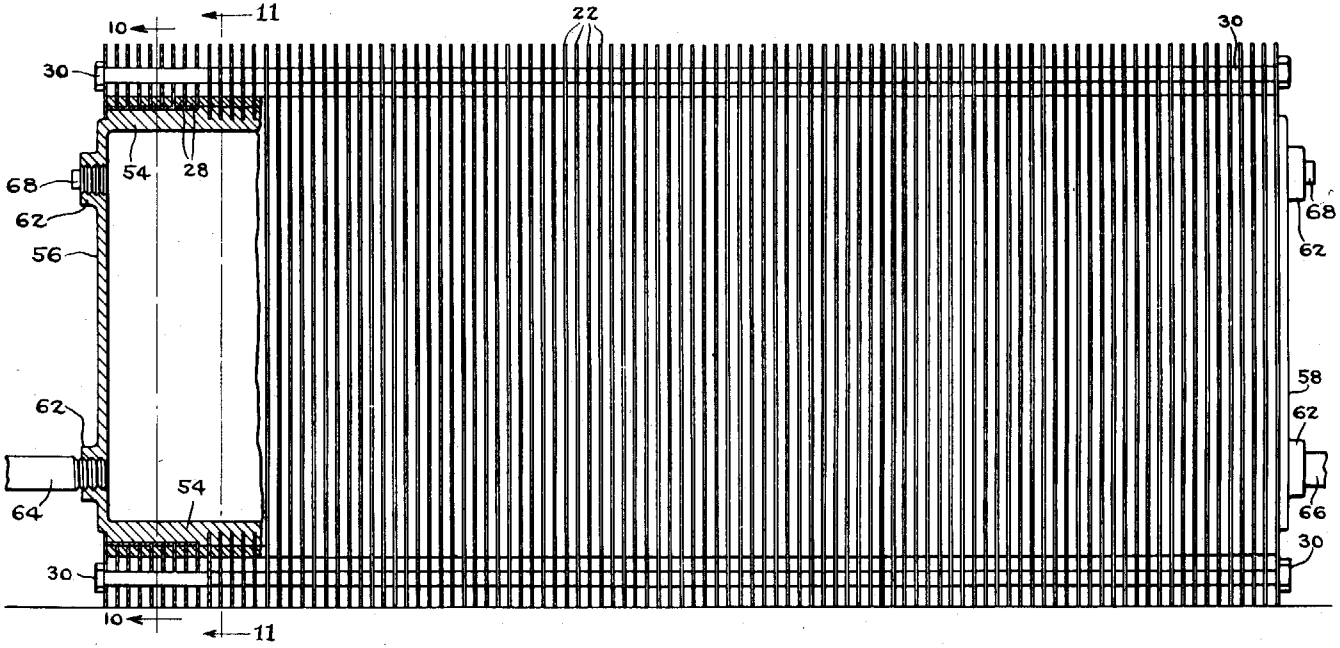
Figure 10:
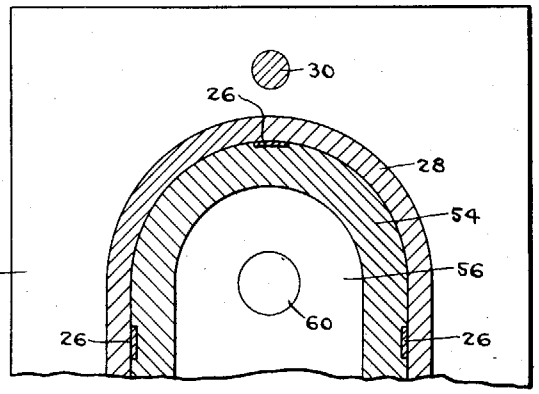
Figure 11:
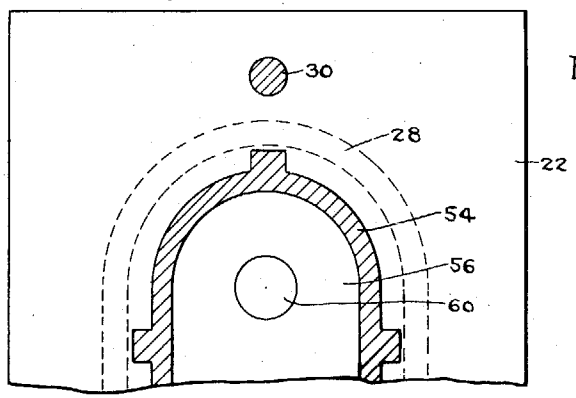
Figure 18:
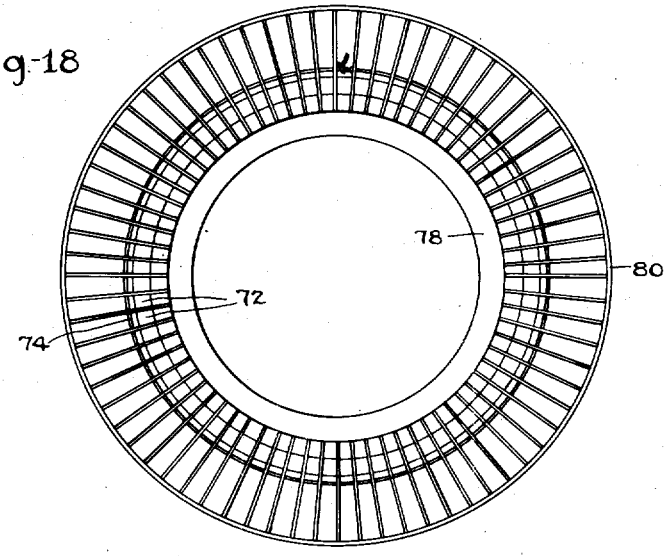
Figure 19:
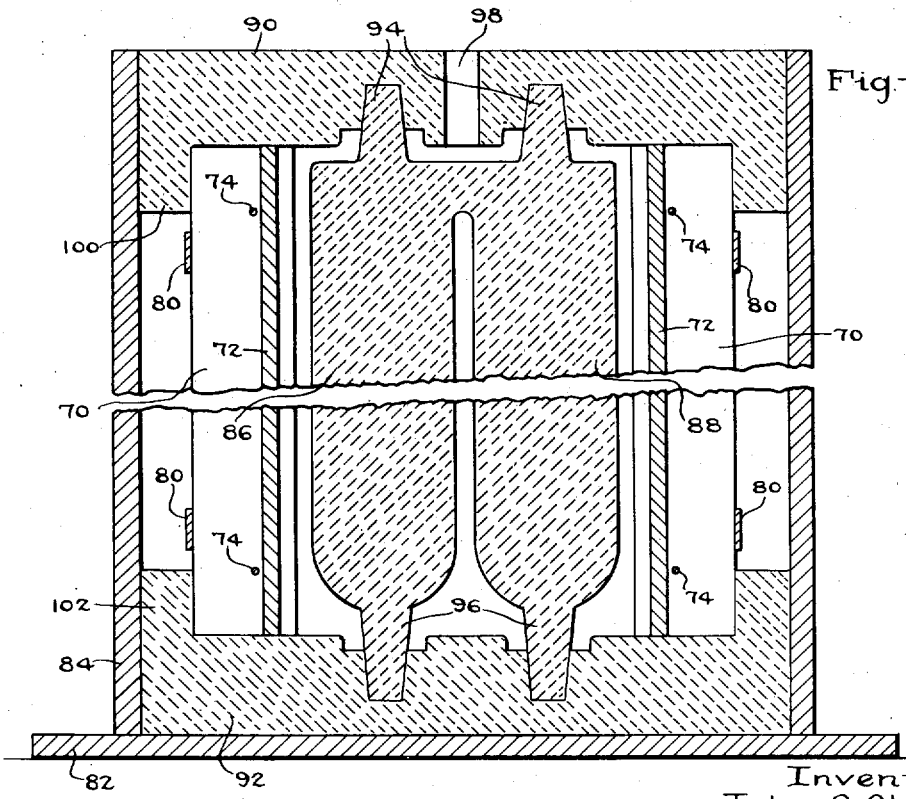
Figure 20:
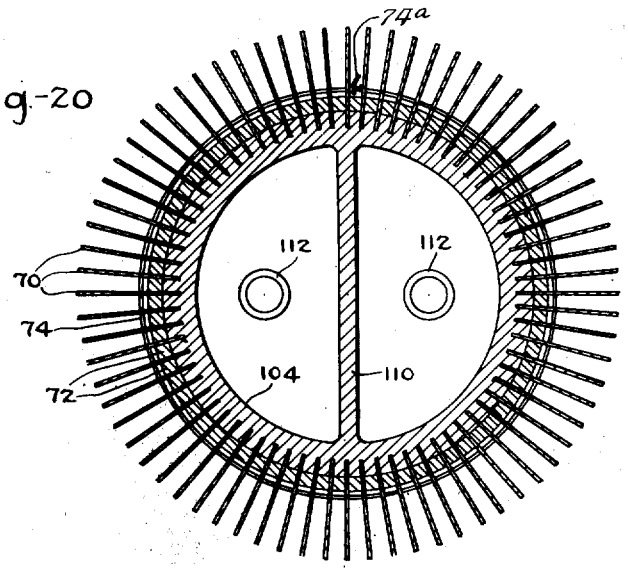
Figure 21:
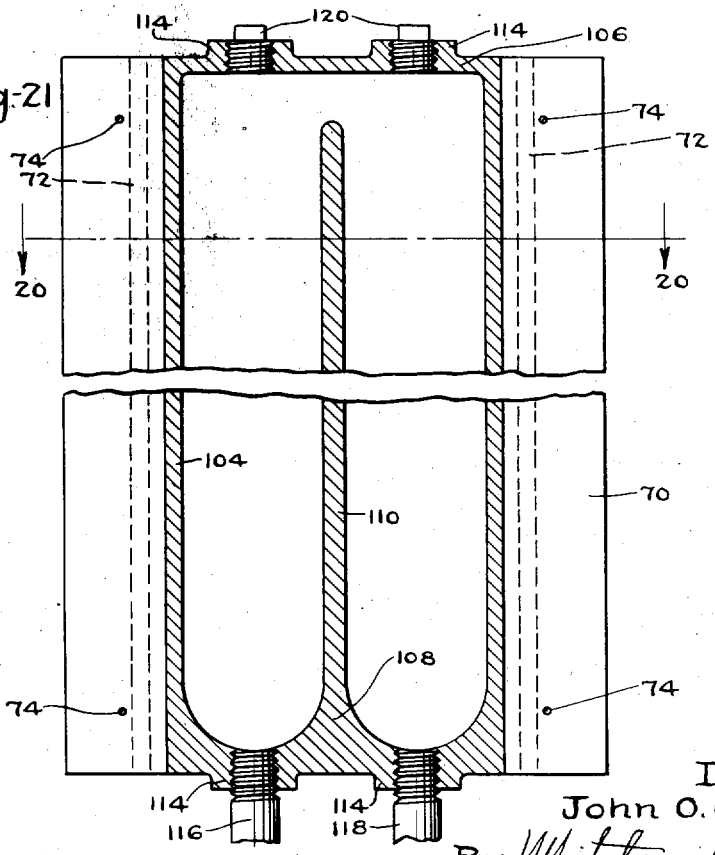

Fig. 1 is a plan view of one of the metal sheets which I employ. Fig. 2 is a plan view of one of the metal spacer elements which I use to separate successive sheets. Fig. 3 is an elevational view of one of the bolts used for securing together a plurality of sheets after they have been built up. Fig. 4 is a cross sectional view of one of the spacer elements. Fig. 5 is a cross-sectional view on the line 5—5 of Fig. 1. Fig. 6 is an elevational sectional view of the built-up structure before being placed in molding position. Fig. 7 is a view in section on the line 7—7 of Fig. 6. Fig. 8 is a view in vertical section showing the built-up structure placed in molding position together with core and mold members and ready for the pouring operation. Fig. 9 is an elevational view of the finished article. Fig. 10 is a fragmentary view in section on the line 10—10 of Fig. 9. Fig. 11 is a fragmentary view in section on the line 11 of Fig. 9. Fig. 12 is a plan view of another form of metal sheets which I may employ. Fig. 13 is a plan view of one of the spacers which I employ with the latter form of sheets. Fig. 14 is a fragmentary view of one of the wires or rods on which the sheets are strung. Fig. 15 is a plan view of a sheet with a spacer element welded thereto. Fig. 16 is a view in section on the line 16—16 of Fig. 15. Fig. 17 is an elevational view of the built-up structure of this latter form of invention before being bent into shape. Fig. 18 is a plan view of the built-up structure bent into shape and before being placed in molding position. Fig. 19 is a view in vertical section showing the built-up structure placed in molding position together with core and mold members and ready for the pouring operation. Fig. 20 is a view of the finished article in transverse section on the line 20—20 of Fig. 21. Fig. 21 is a view in vertical section of the finished article.

Referring first to the form of invention shown in Figs. 1 to 11, the numeral 22 designates a metal sheet which has an oval opening 24 cut out from its middle. The material around this opening is provided with pairs of outwardly-extending cuts at different places whereby tongues are produced, these tongues being turned up at right angles to the sheet to produce lugs 26. As shown, there is one of these lugs at each end of the oval opening and two of the lugs at each side thereof. A large number of the metal sheets may be quickly stamped from scrap pieces of sheet metal. In order to build up a plurality of the sheets 22 in spaced relation to each other, metal oval rings 28 are provided, these rings being of such shape and size as to fit nicely around the lugs 26. The spacer rings 28 hold the piled-up sheets 22 in separated position as shown in Fig. 6, the proper number of sheets and intervening spacers being employed to produce the desired length whereupon they are firmly secured together by means of bolts 30 passing through holes in the sheets. The structure thus built up is placed in molding position and for this purpose a molding flask may be employed if desired. In Fig. 8 the numeral 32 designates a bottom plate upon which a flash 34 of ordinary construction is placed. Before the built-up structure is inserted in the flask, a central sand core 36 and upper and lower mold members 38 and 40 are provided. The center core 36 on its upper surface is provided with two round slightly tapering projections 42, while its lower surface is provided with two similar projections 44. The lower mold member 40 is first placed in the flask and the center core 36 is placed in position, it being observed that the lower mold member contains recesses which receive the projections 44 in such manner that a space for molten metal is left between the two members. The built-up metal structure is then placed around the center core, the diameter of the latter being less than the distance between the inner margins of the sheets 22 so that a space for molten metal is provided between the center core and the spacer rings 28, this space including the inner margins of the sheets.

The upper mold member 38 is now placed over the center core, the upper mold member containing recesses which receive the projections 42 in such manner that a space for molten metal is left between these two members. The upper mold member is provided with gates or holes 46 and 48 through which the molten metal is poured and through which the air may escape. The upper and lower mold members are provided with peripheral flanges 50 and 52 which hold the built-up structure properly positioned. When the molten metal is poured, the inner margins of the sheets 22 are firmly embedded therein and the molten metal becomes firmly attached to the lugs 26 and the spacer rings 28 so that the casting and built-up structure become in effect integral with each other, and if the built-up structure and the casting metal are the same, as, for example, iron, they will be actually integrated, because there will necessarily be fusing of metals which melt at the same temperatures. Referring to the sectional view shown in Fig. 8, the upper and lower portions thereof are shown in slightly different vertical planes so that the lugs 26 appear in the lower portion and do not appear in the upper portion. The appearance of the finished article is shown in Figs. 9, 10 and 11 in which the numeral 54 indicates the cast oval shaped wall while the cast end walls are indicated by the numerals 56 and 58. The projections 42 and 44 of the mold members produce openings 60 which are surrounded by external bosses 62. These openings are screw-threaded so that opposite ends of the radiator may be supplied with inlet and outlet pipes 64 and 66, the other two openings being closed by screw plugs 68.

Referring to the form shown in Figs. 12 to 21, the numeral 70 designates a metal sheet or strip and the numeral 72 designates a metal spacer element which is spot welded to the sheet 70 between the middle and one side thereof as shown in Figs. 15 and 16. A built-up structure is produced by piling up a plurality of the composite elements as shown in Fig. 17 and securing them together by rods or wires 74 which pass through holes 76 in the sheets. This built-up structure is then bent into curved shape around a mandrel 78 as shown in Fig. 18 and is secured in this shape by fastening together the wires 74 as indicated at 74*a* and by means of the hoops 80. Before the built-up structure is placed in molding position, the mandrel 78 is removed. In this form of the invention as well as in that previously described, a flask may be employed to keep the parts in proper position. In Fig. 19 the numeral 82 designates a bottom plate upon which a flask 84 of ordinary construction is placed. A central bifurcated sand core is provided, the two parts 86 and 88 thereof being connected to each other at one end only. Upper and lower mold members 90 and 92 are also provided. The center core on its upper surface is provided with two rounded slightly tapering projections 94 while its lower surface is provided with two similar projections 96. The lower mold member 92 is first placed in the flask and the center core 86—88 is placed in position, it being observed that the lower member contains recesses into which the projections 96 fit. The built-up metal structure is then placed around the central core, the diameter of the latter being less than the distance between the inner margins of the sheets 70 so that a space for molten metal is provided between the core and the spacer elements 72. This space for molten metal includes the inner margins of the plates 70. The upper mold member 90 is now placed over the center core, the upper member containing the recesses which receive the projections 94 in such manner that a space for molten metal is left between these two members. The upper member is provided with a gate or hole 98 through which the molten metal is poured and through which the air escapes. The upper and lower mold members 90 and 92 are provided with peripheral flanges 100 and 102 which hold the built-up structure properly positioned in the flask. When the molten metal is poured the inner margins of the sheets 70 are firmly embedded therein and the molten metal becomes firmly attached to the spacer elements 72 so that the casting and the built-up structure become in effect integral with each other, and if the built-up structure and the casting metal are the same, as, for example, iron, they will be actually integrated because there will necessarily be fusing of metals which melt at the same temperatures. After the finished article is removed from the flask, the hoops 80 are removed and the article has the appearance shown in Figs. 20 and 21 in which the numeral 104 indicates the cast cylindrical wall while the cast end walls are indicated by the numerals 106 and 108. The space between the bifurcated core members 86 and 88 provides a cast partition 110 which extends up from the lower wall 108 and stops short of the upper wall 106. The projections 94 and 96 of the core member produce openings 112 which are surrounded by external bosses 114. These openings are finished by screw-threading them so that inlet and outlet pipes 116 and 118 may be attached at the lower end of the radiator, the upper openings being closed by screw plugs 120.

I claim:

1. A method of manufacturing heat exchangers provided with a multiplicity of thin fins integrally joined thereto, which consists in assembling a stack of apertured plates with the apertures in alinement, spacing said plates with forms provided with previously-fabricated metal openings adjacent the alined apertures of the plates beyond which the margins of the plates around said apertures project inwardly, inserting a core within the chamber formed by the plates and forms, and casting a hollow body of metal within said chamber and around said core and attached to said projecting margins.

2. A method of manufacturing heat exchangers which consists in forming a built-up structure of previously-fabricated metal formed of alternating fin plates and spacer members, comprising a continuous wall, placing a mold member adjacent to and spaced from said wall to form a mold cavity, and casting metal therein and attached to said built-up structure.

3. A method of manufacturing heat exchangers provided with a multiplicity of thin fins integrally joined thereto, which consists in assembling a multiplicity of fin plates having central apertures with a corresponding number of metallic spacer members also having central apertures in such manner that the plates and the spacer members form continuous walls around a chamber formed by said apertures inserting a core within said chamber, and casting metal within said chamber and around said core and attached to said walls.

4. A method of manufacturing heat exchangers which consists in assembling a multiplicity of fin plates, each having a central aperture, with a corresponding number of separate and independent metallic rings of greater internal diameter than said central apertures, and positioning said plates and rings in such manner as to form continuous walls around a chamber extending through all of them, inserting a core within the chamber so formed, and casting a hollow body of metal within said chamber and around said core and attached to said continuous walls.

5. The process of manufacturing heat exchangers provided with a multiplicity of thin fins integrally joined thereto which consists in assembling a multiplicity of pieces of previously-fabricated metal some of which embody said fins to form a continuous wall, placing a mold member adjacent to and spaced from said wall to form a mold cavity and casting metal therein and attached to said continuous wall.

6. A method of manufacturing heat exchangers which consists in forming a built-up structure of previously-fabricated metal comprising alternating fin plates and spacer members which in conjunction form a continuous wall enclosing a chamber, portions of said fin plates extending into said chamber, inserting a core within said chamber, and casting a hollow body of metal within said chamber and around said core and attached to the built-up structure.

7. A method of manufacturing heat exchangers which consists in forming a multiplicity of fin plates with central apertures and forming a corresponding number of spacer plates with corresponding apertures of larger cross sectional area, assembling said fin and spacer plates in such manner as to form a continuous wall around a chamber extending through all said apertures with portions of the fin plates projecting into said chamber, inserting a core within the chamber, and casting a hollow body of metal within said chamber and around said core and embracing said projecting portions and attached to said wall.

8. The process of manufacturing radiators which consists in providing sheet metal members and metal spacer elements, placing together a plurality of said members and spacer elements in alternation to produce a built-up structure having an enclosing wall with open ends, said spacer elements being so disposed that inner and outer margins project in spaced relation from said built-up structure, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

9. The process of manufacturing radiators which consists in producing a built-up structure consisting of a plurality of sheet metal members and metal spacer elements arranged in alternation to provide an enclosing wall with open ends, said spacer elements being so disposed that inner and outer margins project in spaced relation from said built-up structure, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

10. The process of manufacturing radiators which consists in producing a built-up structure consisting of a plurality of sheet metal members and metal spacer elements arranged in alternation to provide an enclosing wall with open ends, said spacer elements being so disposed that outer margins project in spaced relation from said built-up structure, placing said built-up structure in molding position together with a central core and two end mold members, and pouring molten metal into the interior of said built-up structure to form a cast metal shell and whereby said outer margins are left projecting beyond said spacer elements.

11. The process of manufacturing radiators which consists in producing a built-up structure consisting of a plurality of sheet metal members and metal spacer elements arranged in alternation to provide an enclosing wall with open ends, said spacer elements being so disposed that inner margins project in spaced relation within said built-up structure, placing said built-up structure in molding position with a central core and two end mold members, and pouring molten metal into the interior of said built-up structure to form a cast metal shell and whereby said inner margins are anchored in the cast metal and said spacer elements are fused thereto.

12. The process of manufacturing radiators which consists in providing metal sheets, cutting openings in the middle of said sheets, making pairs of cuts in the material around said openings, bending the material between the pairs of cuts at right angles to produce lugs, providing metal spacer rings of such shape and size as to fit snugly around said lugs, placing together a plurality of said sheets and rings in alternation to produce a built-up structure with the inner and outer margins of said sheets projecting from said rings, and casting a metal shell inside of said built-up structure.

13. The process of manufacturing radiators which consists in providing metal sheets, cutting openings in the middle of said sheets, making pairs of cuts in the material around said openings, bending the material between the pairs of cuts at right angles to produce lugs, providing metal spacer rings of such shape and size as to fit snugly around said lugs, placing together a plurality of said sheets and rings in alternation to produce a built-up structure with the inner and outer margins of said sheets projecting from said rings, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

14. A method of manufacturing heat exchangers which consists in forming a built-up structure of previously-fabricated metal pieces, including fin plates, all held together to form a continuous metal wall with the fin plates spaced, placing a mold member adjacent to and spaced from said wall to form a mold cavity, and casting metal therein and attached to said built-up structure.

15. A method of manufacturing heat exchangers which consists in embodying a plurality of apertured spaced fin plates in a built-up metallic structure to form a mold chamber enclosed by metallic walls, inserting a removable core in said chamber, and casting metal between said core and said metallic walls and united to said built-up structure.

16. A method of manufacturing heat exchangers which consists in forming a built-up structure of previously-fabricated metal comprising a multiplicity of metal plates extending outwardly from a central chamber, holding said plates spaced by metallic means, portions of which form with the plates a continuous wall surrounding said chamber, and placing a mold member adjacent to and spaced from said wall to form a mold cavity and casting metal therein and attached to said built-up structure.

In testimony whereof, I hereunto affix my signature.

JOHN OTTO OLSON.